United States Patent
Zhao et al.

(10) Patent No.: US 10,063,160 B2
(45) Date of Patent: Aug. 28, 2018

(54) POWER ADAPTER, CABLE, AND CHARGER

(71) Applicant: Huawei Technologies Co., Ltd., Shenzhen (CN)

(72) Inventors: Chunjiang Zhao, Beijing (CN); Feng Xie, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/314,387

(22) PCT Filed: May 26, 2014

(86) PCT No.: PCT/CN2014/078411
§ 371 (c)(1),
(2) Date: Nov. 28, 2016

(87) PCT Pub. No.: WO2015/180015
PCT Pub. Date: Dec. 3, 2015

(65) Prior Publication Data
US 2017/0104420 A1    Apr. 13, 2017

(51) Int. Cl.
*H02M 7/04* (2006.01)
*H02J 7/02* (2016.01)
*H02M 1/00* (2006.01)

(52) U.S. Cl.
CPC .................. *H02M 7/04* (2013.01); *H02J 7/02* (2013.01); *H02M 2001/0025* (2013.01)

(58) Field of Classification Search
CPC ........ H02M 7/04; H02M 7/003; H02M 7/155; H02M 7/1557; H02M 7/217;
(Continued)

(56) References Cited

U.S. PATENT DOCUMENTS 9,368,008 B2 * 6/2016 Jefferies ............. G08B 13/1418
2007/0108941 A1 * 5/2007 Sainomoto ............ H02J 7/0021
320/112
(Continued)

FOREIGN PATENT DOCUMENTS

CN        101951007 A    1/2011
CN        102055229 A    5/2011
(Continued)

OTHER PUBLICATIONS

Machine Translation and Abstract of Chinese Publication No. CN101951007, Jan. 19, 2011, 5 pages.
(Continued)

*Primary Examiner* — Gustavo Rosario Benitez
(74) *Attorney, Agent, or Firm* — Conley Rose, P.C.

(57) ABSTRACT

A power adapter, a cable, and a charger, where the power adapter includes an output port, a comparator circuit, and a voltage control and shaping circuit. The output port includes a voltage output terminal, a signal feedback terminal, a first ground terminal, and a second ground terminal. The comparator circuit is electrically connected to the signal feedback terminal, and is configured to compare a reference voltage with a charging input voltage of a to-be-charged device that is fed back by the signal feedback terminal to obtain a comparison voltage and output the comparison voltage to the voltage control and shaping circuit.

6 Claims, 3 Drawing Sheets

(58) Field of Classification Search
CPC ... H02M 2001/0025; H02M 2001/0019; H02J 7/02; H02J 7/022; H02J 7/0052; H02J 7/007; H02J 7/0086; H02J 7/047; H02J 2007/0062

See application file for complete search history.

(56) References Cited

U.S. PATENT DOCUMENTS

| | | | | |
|---|---|---|---|---|
| 2009/0135633 | A1* | 5/2009 | Ikeuchi | H02J 5/00 363/126 |
| 2009/0309542 | A1* | 12/2009 | Hung | H01R 31/065 320/111 |
| 2010/0164440 | A1* | 7/2010 | Ikeda | H02J 7/0054 320/162 |
| 2010/0194352 | A1* | 8/2010 | Kitano | H02J 7/0031 320/162 |
| 2010/0231176 | A1* | 9/2010 | Lee | H02J 7/045 320/162 |
| 2011/0101925 | A1* | 5/2011 | Lai | H02J 7/047 320/162 |
| 2012/0249085 | A1* | 10/2012 | Lin | H02J 7/0073 320/162 |
| 2013/0103966 | A1* | 4/2013 | Liu | G06F 1/266 713/340 |
| 2013/0127402 | A1* | 5/2013 | Pulijala | H02J 7/0009 320/107 |
| 2014/0368159 | A1* | 12/2014 | Han | H02M 3/155 320/107 |
| 2015/0357928 | A1* | 12/2015 | Itakura | H02M 1/10 320/128 |

FOREIGN PATENT DOCUMENTS

| | | |
|---|---|---|
| CN | 103594877 A | 2/2014 |
| CN | 203445784 U | 2/2014 |

OTHER PUBLICATIONS

Machine Translation and Abstract of Chinese Publication No. CN103594877, Feb. 19, 2014, 11 pages.
Machine Translation and Abstract of Chinese Publication No. CN203445784, Feb. 19, 2014, 7 pages.
Foreign Communication From a Counterpart Application, PCT Application No. PCT/CN2014/078411, English Translation of International Search Report dated Nov. 26, 2014, 2 pages.
Foreign Communication From a Counterpart Application, PCT Application No. PCT/CN2014/078411, English Translation of Written Opinion dated Nov. 26, 2014, 8 pages.
Foreign Communication From a Counterpart Application, Chinese Application No. 201480036684.9, Chinese Office Action dated Aug. 1, 2017, 7 pages.

* cited by examiner

POWER ADAPTER, CABLE, AND CHARGER

CROSS-REFERENCE TO RELATED APPLICATION

This application is a U.S. National Stage of International Application No. PCT/CN2014/078411, filed on May 26, 2014, which is hereby incorporated by reference in its entirety.

TECHNICAL FIELD

The present disclosure relates to the field of electronic device technologies, and in particular, to a power adapter, a cable, and a charger.

BACKGROUND

With development of communications technologies, chargers of mobile terminals such as chargers of a cell phone, a tablet computer, and the like are all in a form of a universal charger, for example, a form in which one Universal Serial Bus (USB) data cable and one power adapter with a USB port are included so as to resolve a problem that chargers of multiple types of mobile terminals are incompatible.

A current power adapter is connected to a USB Type A plug of a standard USB interface connection line using a USB type A socket, and the other end of the USB interface connection line generally takes the form of a Micro USB interface and is connected to a mobile terminal. When charging is being performed, the power adapter outputs a fixed voltage (the voltage is obtained by conversion from an alternating current and is also generally used as a rated charging voltage of the to-be-charged mobile terminal) such as a voltage of approximately 5 volts (V) so as to charge the mobile terminal using the USB interface connection line connected to the power adapter. Because of contact impedance in a cable of the USB interface connection line and a line loss of the cable, a charging voltage that finally reaches the mobile terminal is less than the rated charging voltage and consequently a charging time is longer than a theoretical charging time.

SUMMARY

Embodiments of the present disclosure provide a power adapter, a cable, and a charger, so that a charging voltage that finally reaches a to-be-charged device is the same as a rated charging voltage of the to-be-charged device so that a charging time for the to-be-charged device is shortened.

According to a first aspect, an embodiment of the present disclosure provides a power adapter and the power adapter includes an output port, a comparator circuit, and a voltage control and shaping circuit. The output port includes a first voltage output terminal, a first signal feedback terminal, a first ground terminal, and a second ground terminal. The comparator circuit is electrically connected to the first signal feedback terminal and is configured to compare a reference voltage with a charging input voltage of a to-be-charged device that is fed back by the first signal feedback terminal to obtain a comparison voltage, and output the comparison voltage to the voltage control and shaping circuit. The voltage control and shaping circuit is electrically connected to both the first voltage output terminal and the comparator circuit and is configured to process an input alternating current signal to generate a charging output voltage, make compensation for the charging output voltage using the comparison voltage input by the comparator circuit, and output, using the first voltage output terminal, a charging output voltage obtained after compensation so as to charge the to-be-charged device. The reference voltage is a rated charging voltage of the to-be-charged device.

In a first possible implementation manner, the first signal feedback terminal is disposed at one end of the first voltage output terminal,= and the second ground terminal is disposed at one end of the first ground terminal.

In a second possible implementation manner, the output port further includes a first differential signal terminal and a second differential signal terminal.

According to a second aspect, an embodiment of the present disclosure provides a cable, and the cable includes a first connector, including a voltage input terminal and a third ground terminal, where the first connector is configured to connect to a to-be-charged device, a second connector, including a second voltage output terminal, a second signal feedback terminal, a fourth ground terminal, and a fifth ground terminal, where the second connector is configured to connect to an output port of a power adapter, and transmission lines, including a charging transmission line, a signal detection transmission line, a first ground wire, and a second ground wire. One end of the charging transmission line is electrically connected to the voltage input terminal and the other end is electrically connected to the second voltage output terminal so that the power adapter supplies power to the to-be-charged device using the cable. One end of the signal detection transmission line is electrically connected to the voltage input terminal and the other end is electrically connected to the second signal feedback terminal so that the power adapter acquires, using the signal detection transmission line, a charging input voltage of the to-be-charged device that is fed back. The fourth ground terminal and the fifth ground terminal are respectively connected to the third ground terminal using the first ground wire and the second ground wire respectively.

In a first possible implementation manner, the first connector further includes at least two data terminals, the second connector further includes a third differential signal terminal and a fourth differential signal terminal, and the transmission lines further include a first differential signal line and a second differential signal line. The third differential signal terminal is connected to at least one data terminal using the first differential signal line, and the fourth differential signal terminal is connected to at least another data terminal using the second differential signal line.

According to a third aspect, an embodiment of the present disclosure provides a charger, including the power adapter described in the first aspect and the cable described in the second aspect. When the cable is plug-connected to the power adapter, a second connector of the cable is plugged into an output port of the power adapter, a first voltage output terminal of the output port is in contact with a second voltage output terminal of the second connector to implement electrical connection, a first signal feedback terminal of the output port is in contact with a second signal feedback terminal of the second connector to implement electrical connection, a first ground terminal of the output port is in contact with a fourth ground terminal of the second connector to implement electrical connection, and a second ground terminal of the output port is in contact with a fifth ground terminal of the second connector to implement electrical connection.

The embodiments of the present disclosure provide a power adapter. A signal feedback terminal is added to the power adapter so that an input charging voltage on a side of a to-be-charged device is acquired, the input charging voltage is compared with a rated charging voltage of the to-be-charged device, and compensation is made, according to a comparison result using an internal circuit of the power adapter, for a charging output voltage output by the power adapter. Therefore, the input charging voltage that reaches the side of the to-be-charged device and is obtained after the charging output voltage output by the power adapter is transmitted using a cable is the same as the rated charging voltage of the to-be-charged device, and therefore, a charging time for the to-be-charged device is shortened. In addition, the cable provided in the embodiments of the present disclosure is used with the power adapter so that the power adapter acquires, using a signal detection transmission line included in the cable, the input voltage of the to-be-charged device that is fed back, and it is implemented that a voltage adapter makes compensation for the charging output voltage. Therefore, the input charging voltage that reaches the side of the to-be-charged device and is obtained after the charging output voltage output by the power adapter is transmitted using the cable is the same as the rated charging voltage of the to-be-charged device. Finally, the charger provided in the embodiments of the present disclosure includes the foregoing power adapter and the foregoing cable, so that the input charging voltage on the side of the to-be-charged device is the same as the rated charging voltage of the to-be-charged device so that the charging time for the to-be-charged device is shortened.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

The following further describes the technical solutions of the embodiments of the present disclosure in detail with reference to the accompanying drawings and embodiments.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

For a better understanding of the embodiments of the present disclosure, the following uses specific embodiments to provide further explanations with reference to the accompanying drawings, and the embodiments constitute no limitation on the embodiments of the present disclosure.

The following describes in detail a power adapter, a cable, and a charger provided in the embodiments of the present disclosure.

Figure 1:
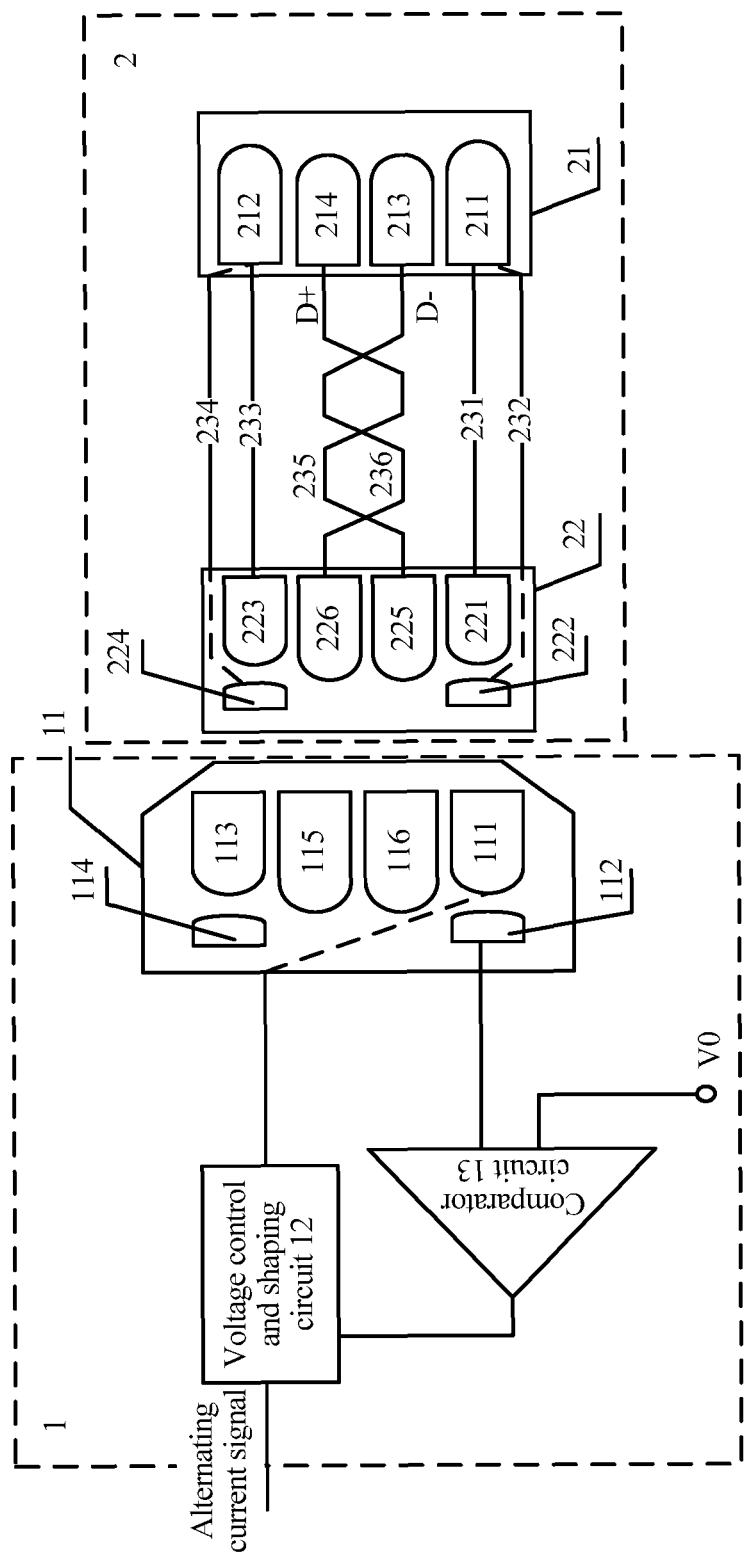
FIG. 1 is a schematic diagram of a charger according to an embodiment of the present disclosure.

FIG. 1 shows a charger according to an embodiment of the present disclosure. As shown in FIG. 1, the charger includes a power adapter 1 and a cable 2, where it is preferably set that the power adapter 1 and the cable 2 are detachably plug-connected to each other.

The power adapter 1 includes an output port 11, and the cable 2 includes a first connector 21 and a second connector 22. When a to-be-charged device is being charged using the charger provided in this embodiment of the present disclosure, the first connector 21 of the cable 2 is plugged into a corresponding interface (not shown in the figure) of the to-be-charged device, the second connector 22 of the cable 2 is plugged into the output port 11 of the power adapter 1, and the power adapter 1 is connected to a supply voltage using a plug (not shown in the figure) so that the supply voltage is converted into a charging output voltage in the power adapter 1 and the charging output voltage passes through the cable to charge the to-be-charged device.

When the to-be-charged device is being charged, the foregoing power adapter 1 and cable 2 may be used together, or a compatibility design may be adopted to implement that the foregoing power adapter 1 and cable 2 are used together with an existing standard cable and an existing power adapter.

The following describes various embodiments of the power adapter 1 and the cable 2.

Figure 2:
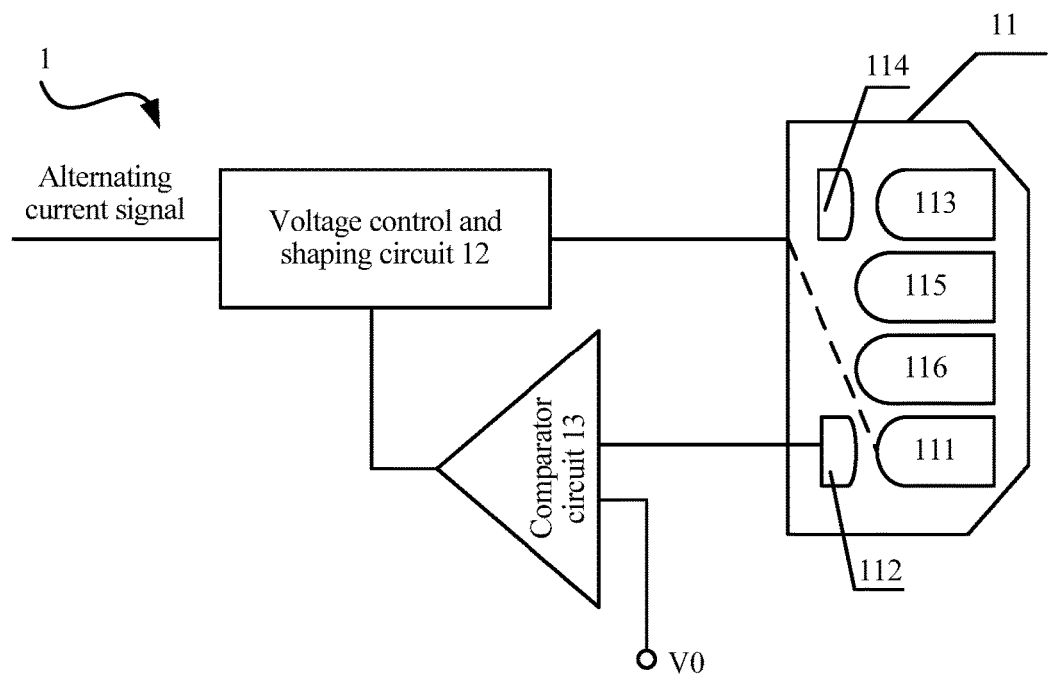
FIG. 2 is a schematic diagram of a power adapter according to an embodiment of the present disclosure.

FIG. 2 is a schematic diagram of a power adapter according to an embodiment of the present disclosure.

As shown in FIG. 2, a power adapter 1 provided in this embodiment of the present disclosure includes an output port 11, a voltage control and shaping circuit 12, and a comparator circuit 13.

The output port 11 includes a first voltage output terminal 111, a first signal feedback terminal 112, a first ground terminal 113, and a second ground terminal 114.

The comparator circuit 13 is electrically connected to the first signal feedback terminal 112 and is configured to compare a reference voltage V0 with a charging input voltage V2 of a to-be-charged device that is fed back by the first signal feedback terminal 112, to obtain a comparison voltage ΔV, and output the comparison voltage ΔV to the voltage control and shaping circuit 12. The reference voltage V0 is a rated charging voltage of the to-be-charged device. The charging input voltage V2 is a charging voltage that is transmitted using a cable (not shown in FIG. 2) and that is actually received by the to-be-charged device (not shown in FIG. 2), which is subsequently described in detail.

The voltage control and shaping circuit 12 is electrically connected to both the first voltage output terminal 111 and the comparator circuit 13 and is configured to process an input alternating current signal to generate a charging output voltage V1, make compensation for the charging output voltage V1 using the comparison voltage ΔV input by the comparator circuit 13, and output, using the first voltage output terminal 111, a charging output voltage V1' obtained after compensation so as to charge the to-be-charged device.

It is understood that the charging output voltage V1 obtained after the voltage control and shaping circuit 12 processes the input alternating current signal is also generally used as a rated charging voltage of the to-be-charged device. For example, if the rated charging voltage of the to-be-charged device is 5 V, generally, the charging output voltage V1 is approximately 5 V. However, because of the cable, the charging input voltage V2 actually received by the to-be-charged device is less than the charging output voltage V1 and the rated charging voltage of the to-be-charged device, and is, for example, 4.8 V. In this embodiment of the present disclosure, compensation is made for the charging output voltage V1 using the comparison voltage ΔV so that after the compensation, a charging input voltage that actually reaches the to-be-charged device is approximately the same as the charging output voltage V1 and the rated charging voltage of the to-be-charged device.

In an example, the comparator circuit 13 is a comparator. The first signal feedback terminal 112 is connected to a non-inverting input end of the comparator and the reference voltage signal V0 is connected to an inverting input end of the comparator. The comparison voltage ΔV is:

$$\Delta V = V2 - V0. \quad \text{(formula 1)}$$

The charging output voltage V1' obtained after compensation may be:

$$V1' = V1 + \Delta V = V1 + V2 - V0. \quad \text{(formula 2)}$$

In the foregoing example, only one method for calculating the charging output voltage V1' obtained after compensation is provided. A person skilled in the art understands that another method may be used to calculate the charging output voltage V1' obtained after compensation, and examples are not listed one by one herein.

Figure 3:
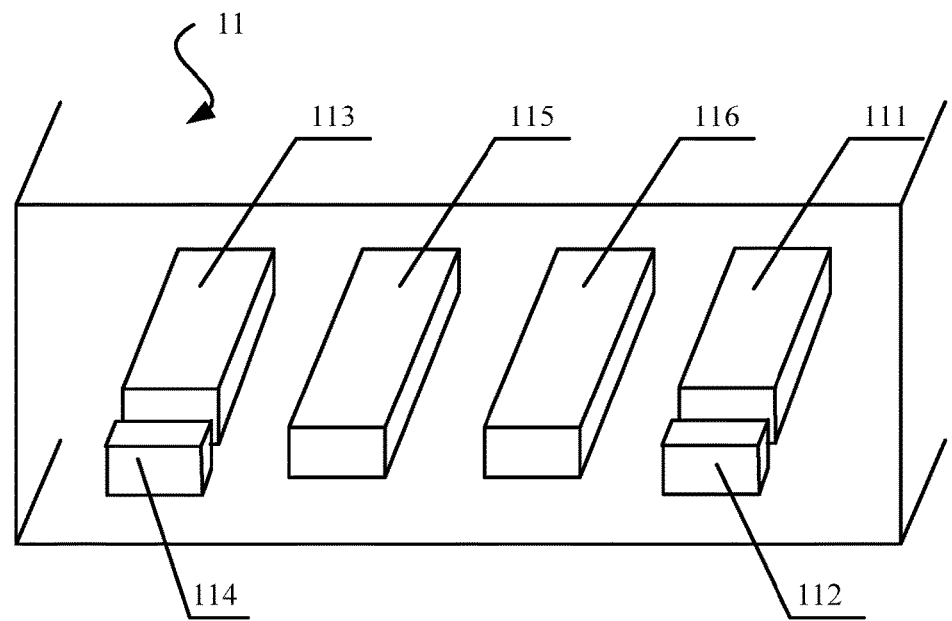
FIG. 3 is a schematic diagram of an output port of a power adapter according to an embodiment of the present disclosure.

The power adapter provided in this embodiment of the present disclosure can be made compatible with a current universal charger cable without changing size specifications of an output port of a current universal power adapter. Details are shown in FIG. 3.

The first signal feedback terminal 112 of the power adapter 1 is disposed at one end of the first voltage output terminal 111, and the second ground terminal 114 is disposed at one end of the first ground terminal 113.

The sum of three lengths, a length of the first signal feedback terminal 112, a length of the first voltage output terminal 111, and a length of an interval between the first signal feedback terminal 112 and the first voltage output terminal 111, is the same as a total length of a VBUS terminal of a current standard power adapter.

The sum of three lengths a length of the second ground terminal 114, a length of the first ground terminal 113, and a length of an interval between the second ground terminal 114 and the first ground terminal 113, is the same as a total length of a ground (GND) terminal of the current standard power adapter.

In addition, the output port 11 further includes a first differential signal terminal 115 and a second differential signal terminal 116.

Therefore, the power adapter 1 provided in this embodiment of the present disclosure may be compatible and used with a cable of an existing universal standard USB interface.

The power adapter 1 further includes components such as an enclosure, a lead, and a plug, which are not shown in FIG. 1 in this embodiment. The terminals of the output terminal 11 are connected to either the voltage control and shaping circuit 12 or the comparator circuit 13 using leads led out of the enclosure, and the voltage control and shaping circuit 12 is connected to the plug using the lead to convert a supply voltage into a charging output voltage. In addition to the foregoing described voltage control and shaping circuit 12 and comparator circuit 13, the power adapter 1 may further include another circuit, which may be in a form of a printed circuit board.

Figure 4:
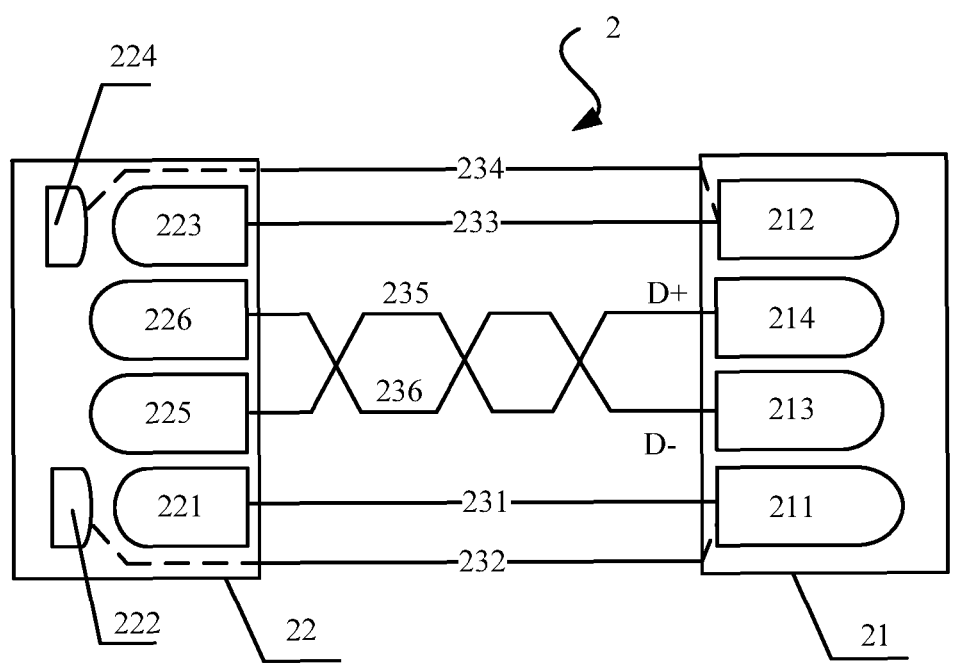
FIG. 4 is a schematic diagram of a cable according to an embodiment of the present disclosure.

A cable 2 provided in an embodiment of the present disclosure is shown in FIG. 4, and includes a first connector 21, a second connector 22, and multiple transmission lines.

The first connector 21 includes a voltage input terminal 211 and a third ground terminal 212, where the first connector 21 is configured to connect to a to-be-charged device; the second connector 22 includes a second voltage output terminal 221, a second signal feedback terminal 222, a fourth ground terminal 223, and a fifth ground terminal 224, where the second connector 22 is configured to connect to an output port of a power adapter. The transmission lines include a charging transmission line 231, a signal detection transmission line 232, a first ground wire 233, and a second ground wire 234.

One end of the charging transmission line 231 is electrically connected to the voltage input terminal 211 and the other end is electrically connected to the second voltage output terminal 221 so that the power adapter supplies power to the to-be-charged device using the charging transmission line 231. One end of the signal detection transmission line 232 is electrically connected to the voltage input terminal 211, and the other end is electrically connected to the second signal feedback terminal 222 so that the power adapter acquires, using the signal detection transmission line 232, a charging input voltage of the to-be-charged device that is fed back. The fourth ground terminal 223 and the fifth ground terminal 224 are connected to the third ground terminal 212 using the first ground wire 233 and the second ground wire 234 respectively.

A resistance of the charging transmission line 231 is small, and may be at an order of magnitude of $10^{-1}$ ohms or less; therefore, supplying power to the to-be-charged device using the charging transmission line 231 causes a specific voltage loss. A resistance of the signal detection transmission line 232 is large, and may be at a megohm order of magnitude; therefore, a voltage loss on the signal detection transmission line 232 may be ignored. Likewise, as a charging transmission signal loop, the first ground wire 233 also has a small resistance, and the second ground wire 234 has a large resistance and is used to provide, for the fifth ground terminal 224, a ground potential that is the same as that of the third ground terminal 212.

In addition, the first connector 21 further includes at least two data terminals, data terminals 213 and 214, shown in the figure. The second connector 22 further includes a third differential signal terminal 225 and a fourth differential signal terminal 226. The transmission line 23 further includes two differential signal lines 235 and 236. The third differential signal terminal 225 is connected to the data terminal 213 using the differential signal line 235. The fourth differential signal terminal 226 is connected to the data terminal 214 using the other differential signal line 236.

The cable provided in this embodiment of the present disclosure can be made compatible with a current universal power adapter without changing size specifications of a connector of a current universal cable. Details are shown in FIG. 4.

The second signal feedback terminal 222 of the second connector 22 is disposed at one end of the second voltage output terminal 221 and the fifth ground terminal 224 is disposed at one end of the fourth ground terminal 223.

The sum of three lengths, a length of the second signal feedback terminal 222, a length of the second voltage output terminal 221, and a length of an interval between the second signal feedback terminal 222 and the second voltage output terminal 221, is the same as a total length of a VBUS terminal of a current standard USB cable connector.

The sum of three lengths, a length of the fifth ground terminal 224, a length of the fourth ground terminal 223, and a length of an interval between the fifth ground terminal 224 and the fourth ground terminal 223, is the same as a total length of a GND terminal of the current standard USB cable connector.

Further as shown in FIG. 1, when the power adapter 1 and the cable 2 provided in the embodiments of the present disclosure are plug-connected to each other, and the output terminal 11 of the power adapter 1 and the second connector 22 of the cable 2 are plug-connected to each other, the first voltage output terminal 111 is in contact with the second voltage output terminal 221, the first signal feedback terminal 112 is in contact with the second signal feedback terminal 222, the first ground terminal 113 is in contact with the fourth ground terminal 223, and the second ground terminal 114 is in contact with the fifth ground terminal 224. The power adapter 1 processes the input alternating current signal to generate the charging output voltage V1 and the charging output voltage V1 is transmitted to the to-be-charged device using the first voltage output terminal 111, the second voltage output terminal 221, the charging transmission line 231, and the voltage input terminal 211, and is used as the charging input voltage V2. The charging input voltage V2 of the to-be-charged device is detected using the voltage input terminal 211, the signal detection transmission line 232, the second signal feedback terminal 222, and the first signal feedback terminal 112, and is fed back to the comparator circuit 13. The power adapter 1 compares the charging input voltage V2 with the reference voltage signal V0 to obtain the comparison voltage ΔV, makes compensation for the charging output voltage V1 according to the comparison voltage ΔV, and outputs the charging output voltage V1' obtained after compensation to the to-be-charged device for charging.

According to the charger in the embodiments of the present disclosure, a charging input voltage actually received by a to-be-charged device is sampled, a charging output voltage of a power adapter is corrected according to a sampling result to compensate for contact impedance in a cable and a line loss of the cable so that an input charging voltage that reaches a side of the to-be-charged device and is obtained after transmission using the cable is the same as a rated charging voltage of the to-be-charged device; therefore, a charging time for the terminal device is shortened.

In the foregoing implementation manners, the objective, technical solutions, and benefits of the present disclosure are further described in detail. It should be understood that the foregoing descriptions are merely some implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A power adapter comprising:
an output port comprising a first voltage output terminal, a first signal feedback terminal, a first ground terminal, and a second ground terminal;
a comparator circuit electrically coupled to the first signal feedback terminal; and
a voltage control and shaping circuit electrically coupled to both the first voltage output terminal and the comparator circuit,
wherein the comparator circuit is configured to:
receive a charging input voltage of a to-be-charged device, the charging input voltage of the to-be-charged device being received from the first signal feedback terminal of the output port, and the charging input voltage of the to-be-charged device corresponding to a voltage received by the to-be-charged device from the first voltage output terminal of the output port;
receive a reference voltage, the reference voltage being a rated charging voltage of the to-be-charged device;
compare the reference voltage with the charging input voltage of the to-be-charged device to obtain a comparison voltage; and
wherein the voltage control and shaping circuit is configured to:
process an input alternating current signal to generate a charging output voltage;
determine a compensation for the charging output voltage using the comparison voltage input by the comparator circuit;
output, using the first voltage output terminal, a compensated charging output voltage obtained after compensation to charge the to-be-charged device; and
obtain the compensated charging output voltage by adding the comparison voltage to the charging output voltage.

2. The power adapter according to claim 1, wherein the first signal feedback terminal is disposed at one end of the first voltage output terminal, and the second ground terminal is disposed at one end of the first ground terminal.

3. The power adapter according to claim 1, wherein the output port further comprises a first differential signal terminal and a second differential signal terminal.

4. The power adapter according to claim 1, wherein the comparator circuit is further configured to obtain the comparison voltage by subtracting the reference voltage from the charging input voltage of the to-be-charged device.

5. A power adapter method comprising:
receiving a charging input voltage of a to-be-charged device, the charging input voltage of the to-be-charged device being received from a first signal feedback terminal of an output port, and the charging input voltage of the to-be-charged device corresponding to a voltage received by the to-be-charged device from a first voltage output terminal of the output port;
receiving a reference voltage, the reference voltage being a rated charging voltage of the to-be-charged device;
comparing the reference voltage with the charging input voltage of the to-be-charged device to obtain a comparison voltage;
outputting the comparison voltage to a voltage control and shaping circuit;
processing an input alternating current signal to generate a charging output voltage;
determining a compensation for the charging output voltage using the comparison voltage; outputting a compensated charging output voltage after compensation to charge the to-be-charged device; and
obtaining the comparison voltage by subtracting the reference voltage from the charging input voltage of the to-be-charged device.

6. The method according to claim 5, wherein the compensated charging output voltage is obtained by adding the comparison voltage to the charging output voltage.

* * * * *